US012647494B2

(12) United States Patent
Srinivasarangan et al.

(10) Patent No.: US 12,647,494 B2
(45) Date of Patent: Jun. 2, 2026

(54) SYSTEM AND METHOD FOR COMMUNICATION DATA IDENTIFICATION AND ALERT GENERATION VIA A MACHINE LEARNING FRAMEWORK

(71) Applicant: BANK OF AMERICA CORPORATION, Charlotte, NC (US)

(72) Inventors: Anantharajan Srinivasarangan, Chennai (IN); Dinesh Kumar Agrawal, Rowlett, TX (US); Kiran Pulla, Hyderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 30 days.

(21) Appl. No.: 18/760,542

(22) Filed: Jul. 1, 2024

(65) Prior Publication Data

US 2026/0006103 A1     Jan. 1, 2026

(51) Int. Cl.
*H04L 67/55*        (2022.01)
*G06F 3/0481*       (2022.01)
*H04L 45/16*        (2022.01)

(52) U.S. Cl.
CPC ............ *H04L 67/55* (2022.05); *G06F 3/0481* (2013.01); *H04L 45/16* (2013.01)

(58) Field of Classification Search
CPC ........ H04L 67/55; H04L 45/16; G06F 3/0481
See application file for complete search history.

(56) References Cited

U.S. PATENT DOCUMENTS

| | | | |
|---|---|---|---|
| 9,297,723 B1 | 3/2016 | Hofmann | |
| 9,876,674 B1 | 1/2018 | Murray | |
| 10,154,006 B2 | 12/2018 | Haensgen | |
| 11,881,981 B2 | 1/2024 | Watfa | |
| 12,028,229 B2 | 7/2024 | Dickgiesser | |
| 2011/0207491 A1 | 8/2011 | Swaminathan | |
| 2013/0257623 A1 | 10/2013 | Bagasra | |
| 2014/0122140 A1 | 5/2014 | Rijnders | |
| 2022/0050699 A1 * | 2/2022 | Momchilov | .......... G06F 9/5077 |
| 2022/0092605 A1 | 3/2022 | Razin | |
| 2023/0198855 A1 | 6/2023 | Ganesan | |
| 2023/0198858 A1 | 6/2023 | Suto | |
| 2023/0274182 A1 | 8/2023 | Alexander | |
| 2023/0385605 A1 | 11/2023 | Xue | |
| 2024/0007877 A1 | 1/2024 | Kunjukrishnan | |
| 2024/0114362 A1 | 4/2024 | Wang | |
| 2024/0121628 A1 | 4/2024 | Wang | |
| 2024/0121636 A1 | 4/2024 | Wang | |
| 2024/0296086 A1 * | 9/2024 | Bonam | ............... G06F 11/0751 |
| 2024/0364581 A1 * | 10/2024 | Pannu | ................ H04L 41/0677 |

* cited by examiner

*Primary Examiner* — Suraj M Joshi

(74) *Attorney, Agent, or Firm* — Moore & Van Allen PLLC; Andrew T. Wood

(57)          ABSTRACT

Systems, computer program products, and methods are described herein for communication data identification and alert generation via a machine learning framework. The present disclosure includes determining a first status of an underlying service, receiving a stream of interaction data from a first user via at least one channel, classifying an interaction via a first machine learning model, generating a first notification signal via a second machine learning model, wherein the second machine learning model may be provided, as inputs, the first status of the underlying service and an interaction pattern associated with the identity, and transmitting the first notification signal via the at least one channel to a first endpoint device associated with the first user.

20 Claims, 7 Drawing Sheets

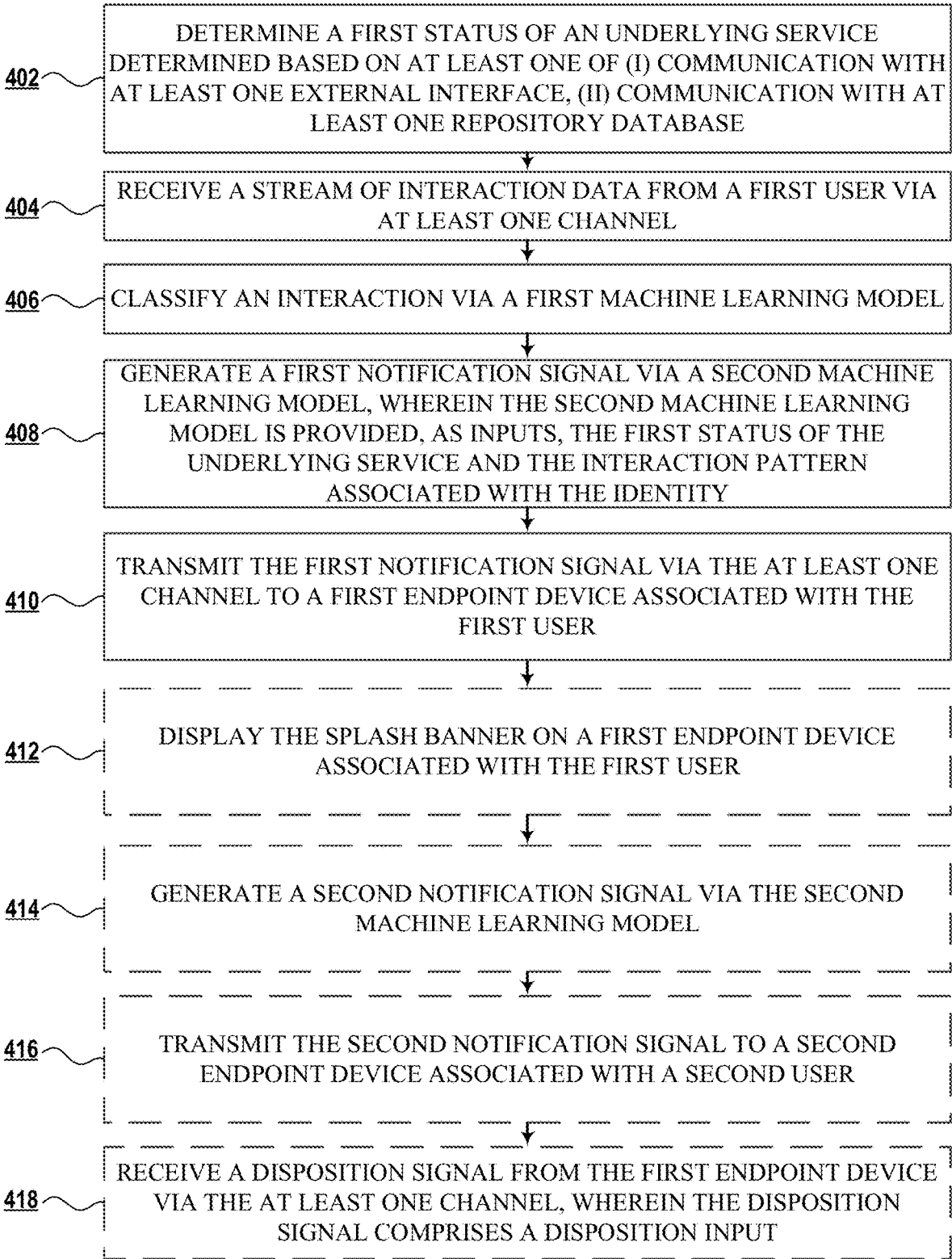

402 — DETERMINE A FIRST STATUS OF AN UNDERLYING SERVICE DETERMINED BASED ON AT LEAST ONE OF (I) COMMUNICATION WITH AT LEAST ONE EXTERNAL INTERFACE, (II) COMMUNICATION WITH AT LEAST ONE REPOSITORY DATABASE

404 — RECEIVE A STREAM OF INTERACTION DATA FROM A FIRST USER VIA AT LEAST ONE CHANNEL

406 — CLASSIFY AN INTERACTION VIA A FIRST MACHINE LEARNING MODEL

408 — GENERATE A FIRST NOTIFICATION SIGNAL VIA A SECOND MACHINE LEARNING MODEL, WHEREIN THE SECOND MACHINE LEARNING MODEL IS PROVIDED, AS INPUTS, THE FIRST STATUS OF THE UNDERLYING SERVICE AND THE INTERACTION PATTERN ASSOCIATED WITH THE IDENTITY

410 — TRANSMIT THE FIRST NOTIFICATION SIGNAL VIA THE AT LEAST ONE CHANNEL TO A FIRST ENDPOINT DEVICE ASSOCIATED WITH THE FIRST USER

412 — DISPLAY THE SPLASH BANNER ON A FIRST ENDPOINT DEVICE ASSOCIATED WITH THE FIRST USER

414 — GENERATE A SECOND NOTIFICATION SIGNAL VIA THE SECOND MACHINE LEARNING MODEL

416 — TRANSMIT THE SECOND NOTIFICATION SIGNAL TO A SECOND ENDPOINT DEVICE ASSOCIATED WITH A SECOND USER

418 — RECEIVE A DISPOSITION SIGNAL FROM THE FIRST ENDPOINT DEVICE VIA THE AT LEAST ONE CHANNEL, WHEREIN THE DISPOSITION SIGNAL COMPRISES A DISPOSITION INPUT

FIG. 4A

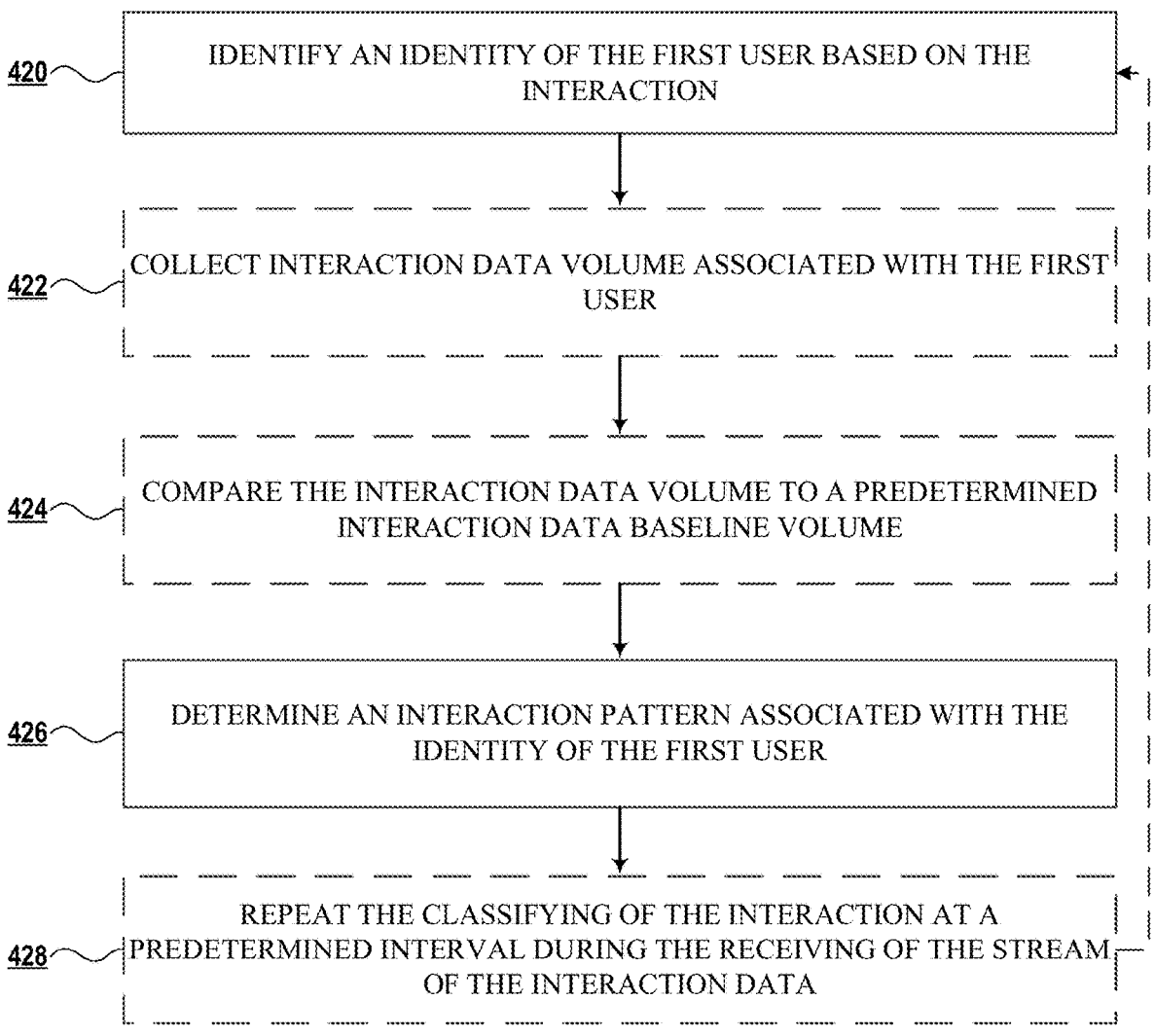

420 — IDENTIFY AN IDENTITY OF THE FIRST USER BASED ON THE INTERACTION

422 — COLLECT INTERACTION DATA VOLUME ASSOCIATED WITH THE FIRST USER

424 — COMPARE THE INTERACTION DATA VOLUME TO A PREDETERMINED INTERACTION DATA BASELINE VOLUME

426 — DETERMINE AN INTERACTION PATTERN ASSOCIATED WITH THE IDENTITY OF THE FIRST USER

428 — REPEAT THE CLASSIFYING OF THE INTERACTION AT A PREDETERMINED INTERVAL DURING THE RECEIVING OF THE STREAM OF THE INTERACTION DATA

FIG. 4B

SYSTEM AND METHOD FOR COMMUNICATION DATA IDENTIFICATION AND ALERT GENERATION VIA A MACHINE LEARNING FRAMEWORK

TECHNOLOGICAL FIELD

Example implementations of the present disclosure relate to a system and method for communication data identification and alert generation via a machine learning framework.

BACKGROUND

Users contacting entities via various channels frequently experience negative interactions due to unresolved queries and a poor user experience. Additionally, users are subjected to excessive redirections, which can lead to spam and Denial of Service incidents caused by high volumes of contact attempts. The lack of a robust system to manage these interactions leads to frequent disconnects and repeated, unsuccessful contact attempts through multiple channels, including phone, chat, and email, further exacerbating the issue. This disclosure addresses the critical need for communication data identification and alert generation via a machine learning framework.

BRIEF SUMMARY

Systems, methods, and computer program products are provided for communication data identification and alert generation via a machine learning framework.

In one aspect, a system for communication data identification and alert generation via a machine learning framework is presented. The system includes a processing device, a non-transitory storage device containing instructions when executed by the processing device, causes the processing device to perform the steps of determining a first status of an underlying service, wherein the first status may be determined based on at least one selected from the group consisting of (i) communication with at least one external interface, (ii) communication with at least one repository database, receiving a stream of interaction data from a first user via at least one channel, classifying an interaction via a first machine learning model, wherein classifying the interaction may include identifying an identity of the first user based on the interaction, and determining an interaction pattern associated with the identity of the first user, generating a first notification signal via a second machine learning model, wherein the second machine learning model may be provided, as inputs, the first status of the underlying service and the interaction pattern associated with the identity, and transmitting the first notification signal via the at least one channel to a first endpoint device associated with the first user.

In some implementations, the first notification signal may include a splash banner.

In some implementations, the instructions may further cause the processing device to perform the steps of displaying the splash banner on a first endpoint device associated with the first user.

In some implementations, the instructions may further cause the processing device to perform the steps of generating a second notification signal via the second machine learning model and transmitting the second notification signal to a second endpoint device associated with a second user.

In some implementations, determining the interaction pattern associated with the identity of the first user may include the instructions further causing the processing device to perform the steps of: collecting interaction data volume associated with the first user, and comparing the interaction data volume to a predetermined interaction data baseline volume.

In some implementations, the instructions further causing the processing device to perform the steps of repeating the classifying of the interaction at a predetermined interval during the receiving of the stream of the interaction data.

In some implementations, the instructions may further cause the processing device to perform the steps of receiving, after transmitting the first notification signal, a disposition signal from the first endpoint device via the at least one channel, wherein the disposition signal may include a disposition input.

In some implementations, the disposition input may include a request to re-route the stream of the interaction data.

In some implementations, the identity of the first user may include historical call frequency data and historical call duration data.

In some implementations, the identity of the first user may include resource transfer data associated with an account of the first user.

In some implementations, the at least one external interface may be at least one selected from a group consisting of (i) social media data feeds, and (ii) user-reported digital service disruption aggregates.

In some implementations, the at least one repository database may be at least one selected from a group consisting of (i) monitoring tool feeds, (ii) direct user inputs, and (iii) structured query reporter inputs.

In some implementations, the at least one channel may be at least one selected from a group consisting of (i) a multi-channel cognitive resource platform, (ii) a web interface, (iii) an email interface, (iv) a mobile phone application, and (v) telephone communication.

In another aspect, a computer program product for communication data identification and alert generation via a machine learning framework is presented. The computer program product includes a non-transitory computer-readable medium including code causing an apparatus to determine a first status of an underlying service, wherein the first status may be determined based on at least one selected from the group consisting of (i) communication with at least one external interface, (ii) communication with at least one repository database, receive a stream of interaction data from a first user via at least one channel, classify an interaction via a first machine learning model, wherein classifying the interaction may include identifying an identity of the first user based on the interaction, determining an interaction pattern associated with the identity of the first user, generate a first notification signal via a second machine learning model, wherein the second machine learning model may be provided, as inputs, the first status of the underlying service and the interaction pattern associated with the identity, and transmit the first notification signal via the at least one channel to a first endpoint device associated with the first user.

In some implementations, the first notification signal may include a splash banner. In some implementations, the code may further cause the apparatus to display the splash banner on a first endpoint device associated with the first user.

In some implementations, the code may further cause the apparatus to generate a second notification signal via the second machine learning model and transmit the second notification signal to a second endpoint device associated with a second user.

In some implementations, determining the interaction pattern associated with the identity of the first user may include the code may further cause the apparatus to collect interaction data volume associated with the first user, and compare the interaction data volume to a predetermined interaction data baseline volume.

In some implementations, the code may further cause the apparatus to repeat the classifying of the interaction at a predetermined interval during the receiving of the stream of the interaction data.

In some implementations, the code may further cause the apparatus to receive, after transmitting the first notification signal, a disposition signal from the first endpoint device via the at least one channel, wherein the disposition signal may include a disposition input.

In some implementations, the disposition input may include a request to re-route the stream of the interaction data.

In some implementations, the identity of the first user may include historical call frequency data and historical call duration data.

In some implementations, the identity of the first user may include resource transfer data associated with an account of the first user.

In some implementations, the at least one external interface may be at least one selected from a group consisting of (i) social media data feeds, and (ii) user-reported digital service disruption aggregates.

In some implementations, the at least one repository database may be at least one selected from a group consisting of (i) monitoring tool feeds, (ii) direct user inputs, and (iii) structured query reporter inputs.

In some implementations, the at least one channel may be at least one selected from a group consisting of (i) a multi-channel cognitive resource platform, (ii) a web interface, (iii) an email interface, (iv) a mobile phone application, and (v) telephone communication.

In yet another aspect, a method for communication data identification and alert generation via a machine learning framework is presented. The method may include determining a first status of an underlying service, wherein the first status may be determined based on at least one selected from the group consisting of (i) communication with at least one external interface, (ii) communication with at least one repository database, receiving a stream of interaction data from a first user via at least one channel, classifying an interaction via a first machine learning model, wherein classifying the interaction may include identifying an identity of the first user based on the interaction, and determining an interaction pattern associated with the identity of the first user, generating a first notification signal via a second machine learning model, wherein the second machine learning model may be provided, as inputs, the first status of the underlying service and the interaction pattern associated with the identity, and transmitting the first notification signal via the at least one channel to a first endpoint device associated with the first user.

In some implementations, the first notification signal may include a splash banner.

In some implementations, the method may further include displaying the splash banner on a first endpoint device associated with the first user.

In some implementations, the method may further include generating a second notification signal via the second machine learning model and transmitting the second notification signal to a second endpoint device associated with a second user.

In some implementations, determining the interaction pattern associated with the identity of the first user may include the method further including collecting interaction data volume associated with the first user, and comparing the interaction data volume to a predetermined interaction data baseline volume.

In some implementations, the method may further include repeating the classifying of the interaction at a predetermined interval during the receiving of the stream of the interaction data.

In some implementations, the method may further include receiving, after transmitting the first notification signal, a disposition signal from the first endpoint device via the at least one channel, wherein the disposition signal may include a disposition input.

In some implementations, the disposition input may include a request to re-route the stream of the interaction data.

In some implementations, the identity of the first user may include historical call frequency data and historical call duration data.

In some implementations, the identity of the first user may include resource transfer data associated with an account of the first user.

In some implementations, the at least one external interface may be at least one selected from a group consisting of (i) social media data feeds, and (ii) user-reported digital service disruption aggregates.

In some implementations, the at least one repository database may be at least one selected from a group consisting of (i) monitoring tool feeds, (ii) direct user inputs, and (iii) structured query reporter inputs.

In some implementations, the at least one channel may be at least one selected from a group consisting of (i) a multi-channel cognitive resource platform, (ii) a web interface, (iii) an email interface, (iv) a mobile phone application, and (v) telephone communication.

The above summary is provided merely for purposes of summarizing some example implementations to provide a basic understanding of some aspects of the present disclosure. Accordingly, it will be appreciated that the above-described implementations are merely examples and should not be construed to narrow the scope or spirit of the disclosure in any way. It will be appreciated that the scope of the present disclosure encompasses many potential implementations in addition to those here summarized, some of which will be further described below.

BRIEF DESCRIPTION OF THE DRAWINGS

Having thus described implementations of the disclosure in general terms, reference will now be made the accompanying drawings. The components illustrated in the Figures may or may not be present in certain implementations described herein. Some implementations may include fewer (or more) components than those shown in the Figures.

Figure 1A:
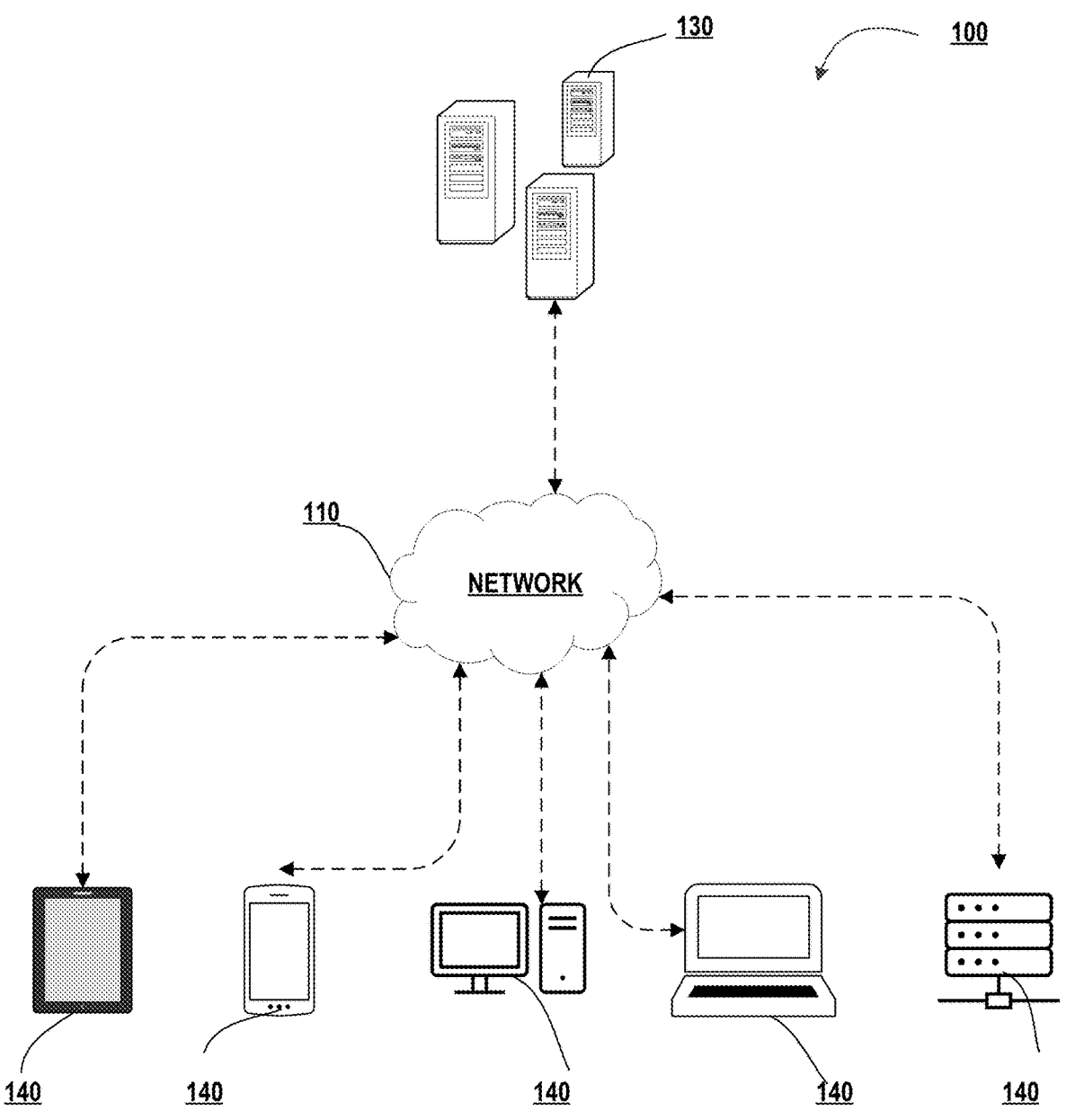
Figure 1B:
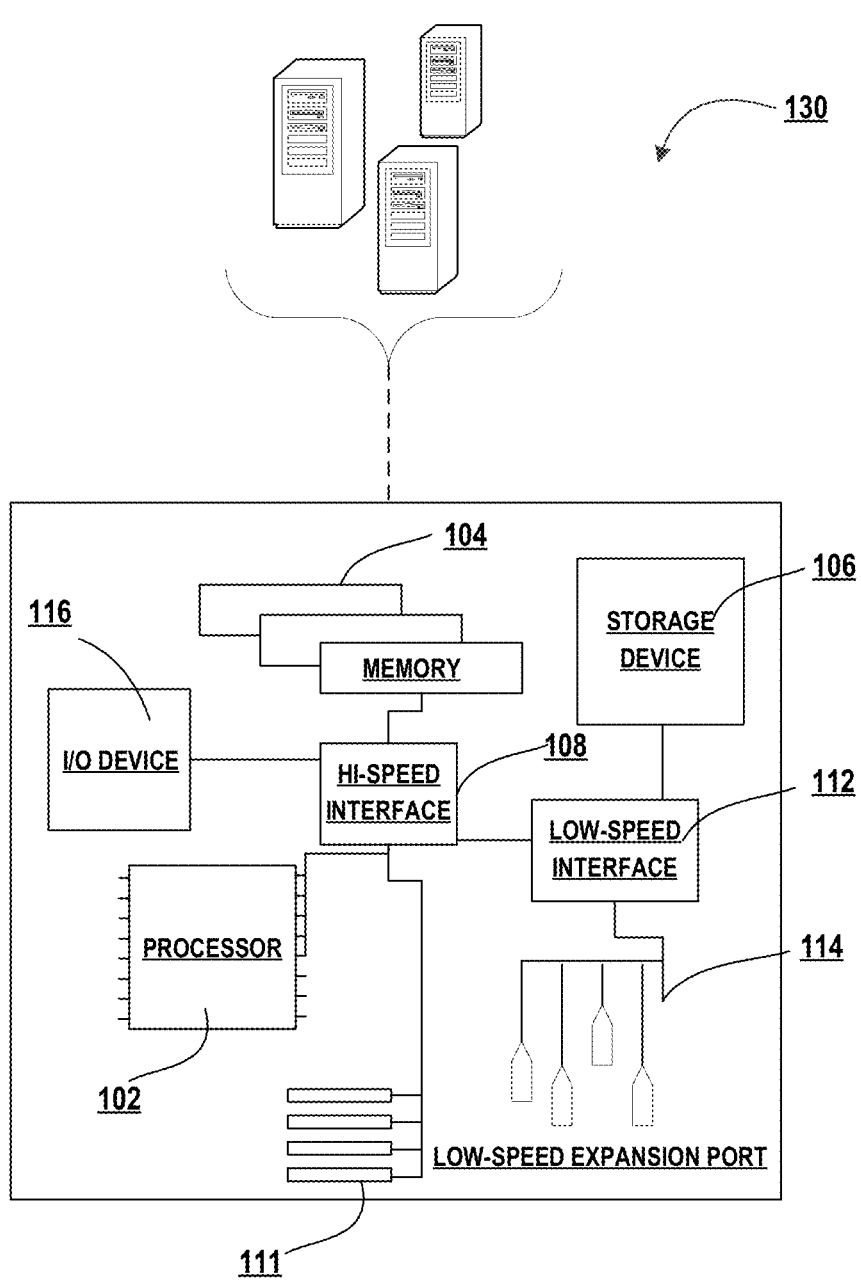
Figure 1C:
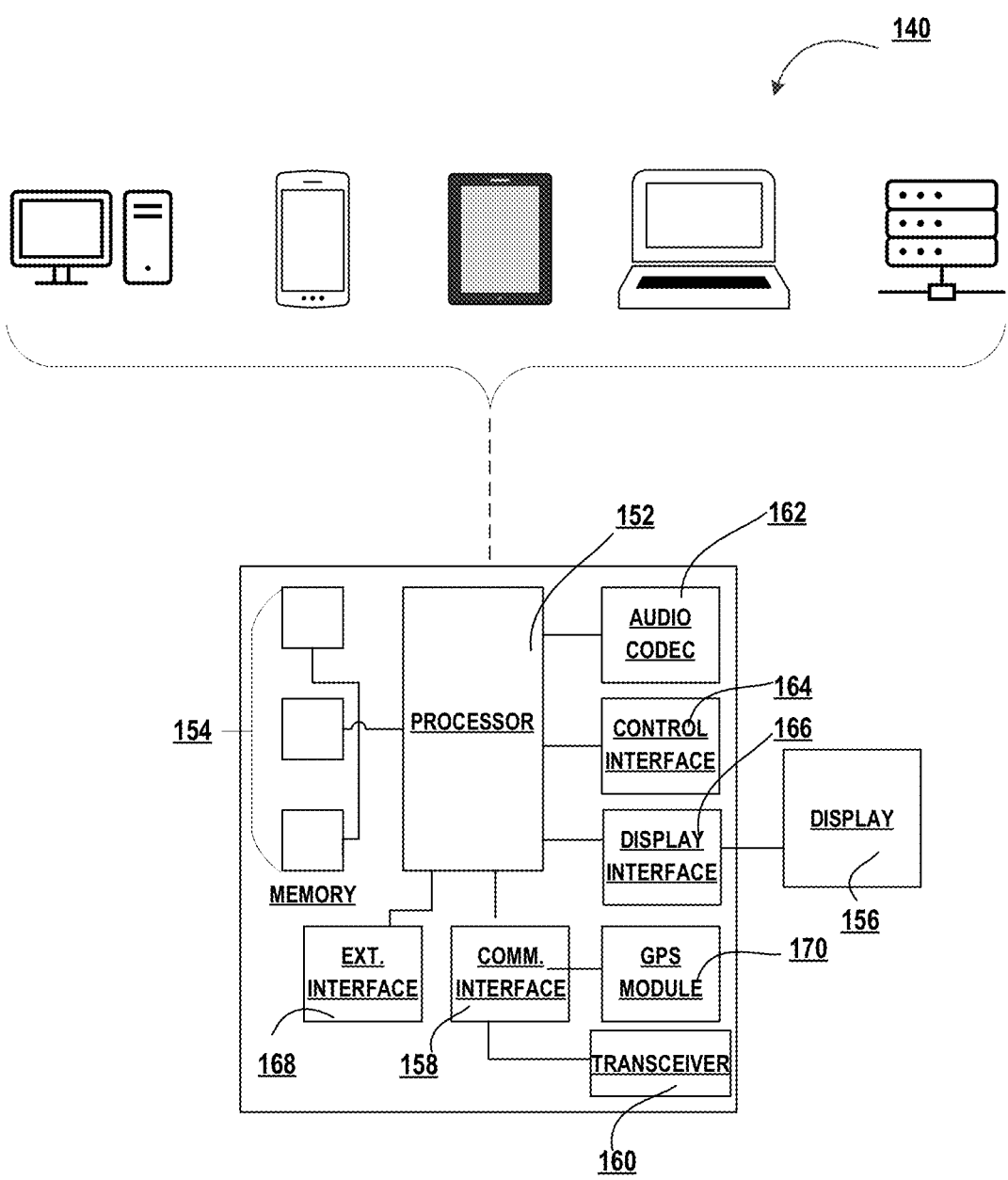
Figure 2:
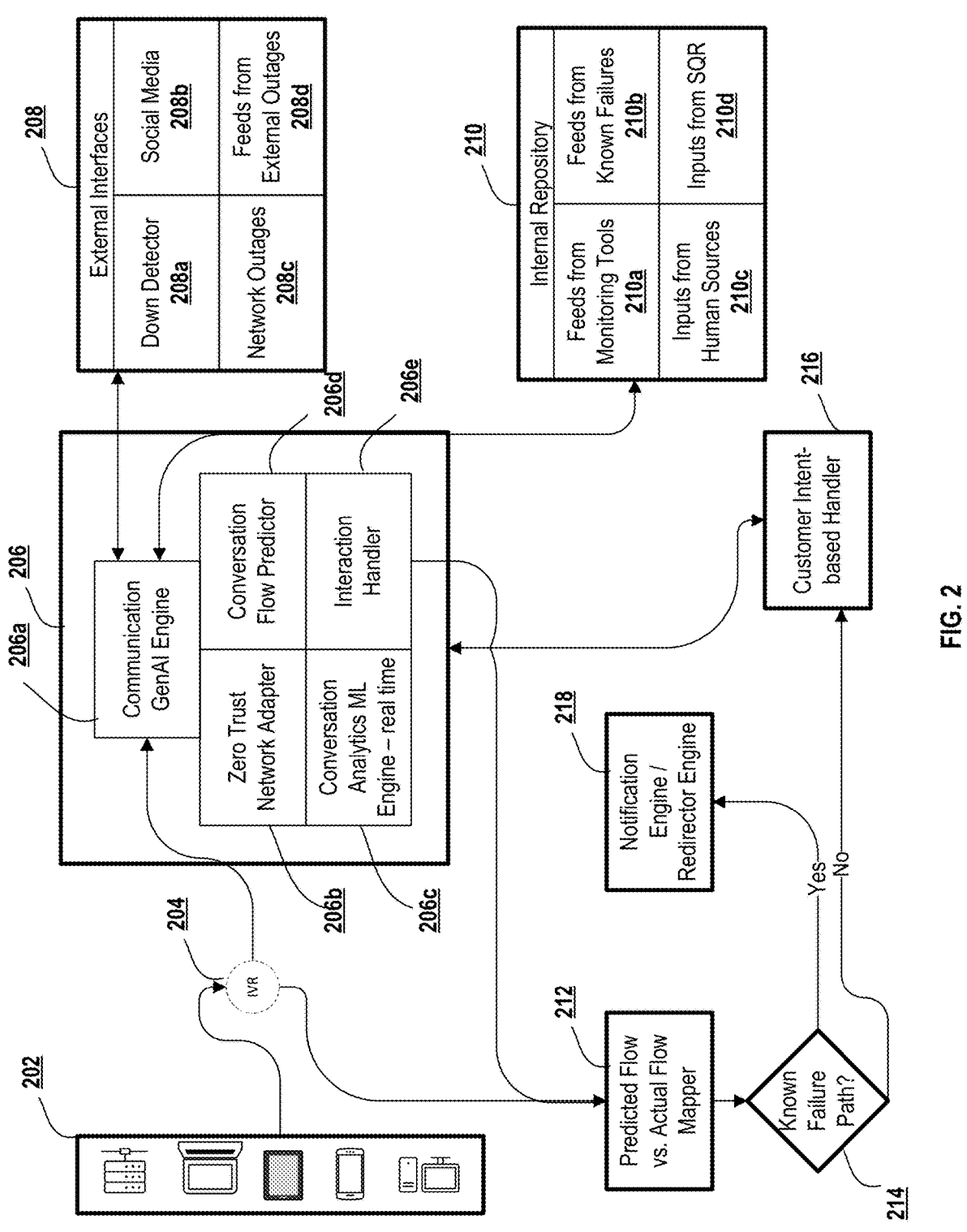
Figure 3:
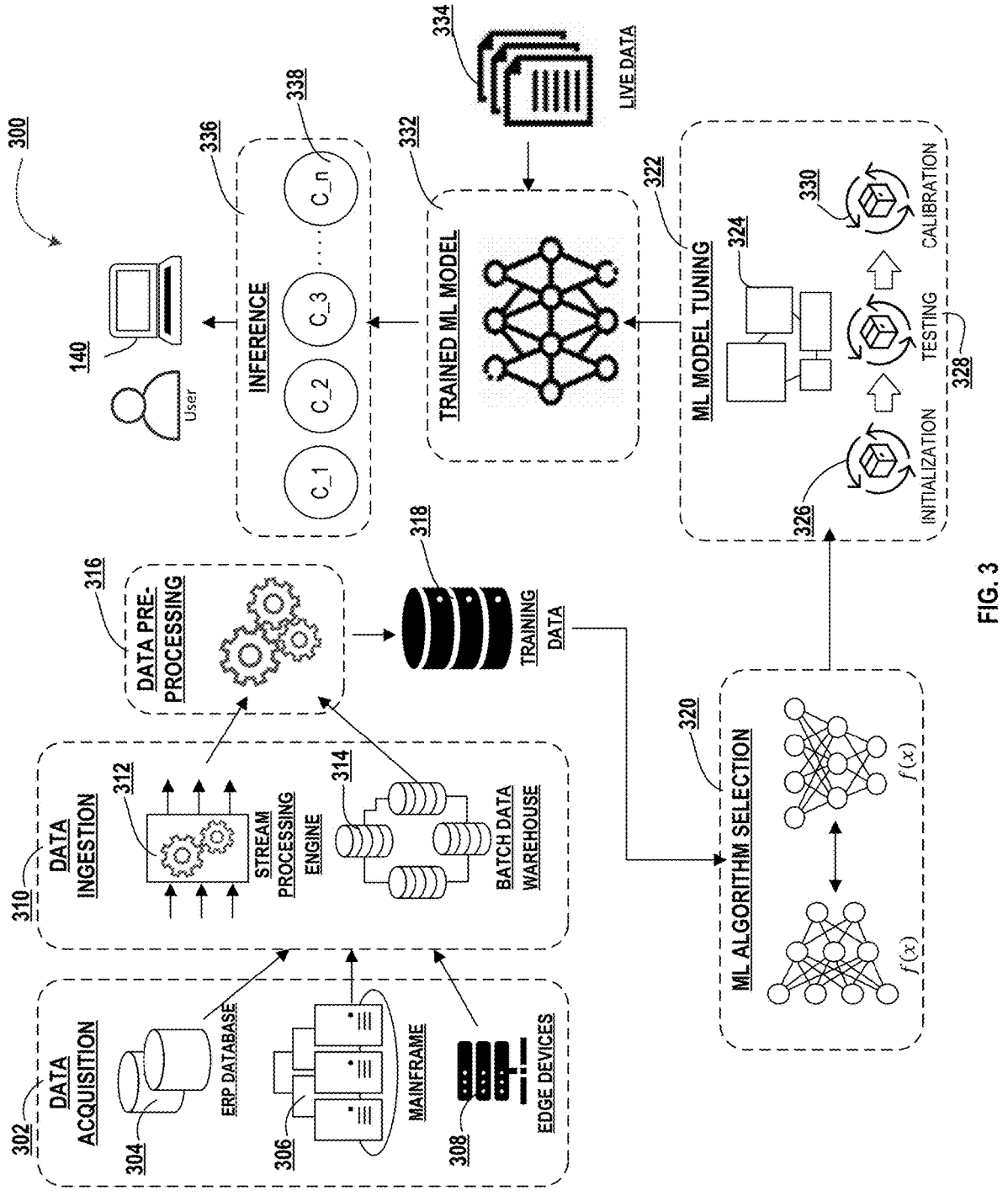

FIGS. 1A-1C illustrate technical components of an exemplary distributed computing environment for communication data identification and alert generation via a machine learning framework, in accordance with an implementation of the disclosure;

FIG. 2 illustrates a graphical architectural representation of communication data identification and alert generation via a machine learning framework, in accordance with an implementation of the disclosure;

FIG. 3 illustrates an exemplary machine learning model subsystem architecture, in accordance with an implementation of the disclosure; and FIGS. 4A-4B illustrate a process flow for communication data identification and alert generation via a machine learning framework, in accordance with an implementation of the disclosure.

DETAILED DESCRIPTION

Implementations of the present disclosure will now be described more fully hereinafter with reference to the accompanying drawings, in which some, but not all, implementations of the disclosure are shown. Indeed, the disclosure may be implemented in many different forms and should not be construed as limited to the implementations set forth herein; rather, these implementations are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some implementations, the user may be an individual having past relationships, current relationships or potential future relationships with an entity. In some implementations, the user may be an employee (e.g., an associate, a project manager, an IT specialist, a manager, an administrator, an internal operations analyst, or the like) of the entity or enterprises affiliated with the entity.

As used herein, a "user interface" or "display" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, user characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some implementations, the system may be owned or operated by an entity. In such implementations, the entity may employ additional computer systems, such as authentication servers, to validate and certify resources inputted by the plurality of users within the system. The system may further use its authentication servers to certify the identity of users of the system, such that other users may verify the identity of the certified users. In some implementations, the entity may certify the identity of the users. Furthermore, authentication information or permission may be assigned to or required from a user, application, computing node, computing cluster, or the like to access stored data within at least a portion of the system.

As used herein, an "engine" may refer to core elements of a computer program, or part of a computer program that serves as a foundation for a larger piece of software and drives the functionality of the software. An engine may be self-contained, but externally controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some implementations, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like. "Interaction data" may refer to the information generated from user engagements with an entity's services, including but not limited to transaction records, communication logs, user behavior analytics, feedback, and service usage patterns. Interaction data may be generated in real-time and provided as a stream of interaction data, for example, during a digital conversation between a user and the entity.

As used herein, "channel" may refer to the various digital paths through which users interact with an entity, such as online banking platforms, mobile applications, automated teller machines (ATMs), and customer service centers (i.e., through the phone).

It should be understood that the word "exemplary" is used herein to mean "serving as an example, instance, or illustration." Any implementation described herein as "exemplary" is not necessarily to be construed as advantageous over other implementations.

As used herein, a "multi-channel cognitive interaction platform" may refer to a system configured to receive, recognize and interpret linguistics of user input and perform user activities accordingly. In general, the multi-channel cognitive interaction platform may parse the user input from the user to detect one or more words that make up the activity input from the user. The multi-channel cognitive interaction platform may then analyze words to determine the user activity. Based on receiving the activity input from the user, in some instances, the multi-channel cognitive interaction platform is configured to generate a parse tree based on detected one or more words and/or the detected keywords. The multi-channel cognitive interaction platform may analyze the parse tree to determine the user activity to be performed and the intent of the user and also to determine any parameters provided by the user for an invoked service. The multi-channel cognitive interaction platform may invoke another application, a service, an activity functionality and the like based on its analysis of parse tree. The multi-channel cognitive interaction platform may be configured to hold complex and branched conversations with the user, in the pursuit of completing one or more user activities. In this regard, the multi-channel cognitive interaction platform is configured to detect and conduct branched conversations using intelligent complex path looping. In some instances, the multi-channel cognitive interaction platform may identify a suitable conversation path for completion of a user-initiated activity and proceed to request information accordingly.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that an element matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some implementations, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some implementations, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

The technical problem solved herein arises from the absence of an integrated system capable of preemptively identifying and addressing potential failures across various communication channels. Users reaching out to an entity via phone, chat, email, or other touchpoints often experience negative interactions due to system inefficiencies. These inefficiencies stem from an inability to predict and mitigate failures, which may lead to unresolved queries and repeated, unsuccessful attempts by users to seek assistance. Moreover, the lack of a proactive approach results in excessive redirections, causing a poor user experience and contributing to issues such as spam and Denial of Service incidents due to high volumes of contact attempts. These challenges are compounded by the system's inability to handle disaster situations and high-traffic conditions effectively, which may cause frequent disconnects and user frustration.

Current solutions involve reactive measures such as manual intervention by support staff, automated call distribution systems, and basic failover mechanisms. However, these solutions are inadequate for several reasons. Manual intervention is labor-intensive and slow and often results in delayed responses and further user dissatisfaction. Automated call distribution systems often lack the sophistication to preemptively identify and manage potential failures or disaster scenarios. Basic mechanisms provide limited redundancy but do not offer comprehensive solutions to prevent user frustration during repeated contact attempts. Consequently, these existing systems fail to provide a seamless and efficient user experience, which may lead to persistent issues and highlights the need for a more advanced and proactive solution.

Addressing these challenges requires the establishment of a system and method for communication data identification and alert generation via a machine learning framework. Such a framework allows for the notification of occurrences of unavailability, due to disasters or other failures, by identifying and taking intelligent actions without requiring intervention from humans. Furthermore, the framework may allow for the actions to be taken of addressing incoming queries by predictively determining the focus of said queries, and therefore resulting in the prevention of repeated attempts to inquire, reduce stress on entity systems, and improve user experience.

To do so, statuses of an entity's underlying services (or a singular service) may be determined based on communicating with external interfaces and/or internal repository databases. A stream of interaction data from an interaction may then be received, which may take the form of audio data, video data, data represented as text, or the like. The interaction is then classified by a machine learning model. Classifying using the machine learning model may include determining the identity of a user initiating the interaction data, collecting the volume of interaction data transmitted and associated with the user, then comparing that volume of interaction data to a predetermined baseline. From this, an interaction pattern may be determined based on the user's identity. The classification of the interaction may be recurring such as to validate the identity of the user throughout the entirety of the interaction. The interaction pattern and the status of the entity's underlying services may then be provided to a machine learning model that is configured to generate notifications specific to those inputs, which essentially provides a customized message to the user based on occurrences overall throughout the network as well as the user's typical interaction habits. This notification may be transmitted to an endpoint device of the user and displayed. Additionally, or alternatively, the notification may be transmitted to an additional endpoint device, for example the endpoint device of a second user, a user associated with the entity (e.g., a customer service representative, or the like). The system may also allow for the receipt of a disposition signal from an endpoint device, which may end the interaction, transfer the interaction elsewhere, or otherwise allows the user to override the notification.

What is more, the present disclosure provides a technical solution to a technical problem. As described herein, the technical problem includes a lack of an integrated system that can preemptively identify and address potential failures across various communication channels, such failures leading to unresolved queries, excessive redirections, spam, Denial of Service incidents, and overall poor user experience. The present disclosure embraces an improvement over existing solutions by allowing for the notification and identification of network failures (i) with fewer steps to achieve the solution (e.g., automating decision-making and task execution, thereby reducing the number of steps needed), thus reducing the amount of network resources, such as processing resources, storage resources, network resources, and/or the like, that are being used, (ii) providing a more accurate solution to problem, thus reducing the number of resources required to remedy any errors made due to a less accurate solution (e.g., leveraging real-time data analysis and machine learning to precisely identify and address issues, thereby reducing the resources needed to correct errors), (iii) removing manual input and waste from the implementation of the solution, thus improving speed and efficiency of the process and conserving network resources (e.g., preventing the necessity for humans to proactively monitor communication channels, communicate failures, and reroute interactions), (iv) determining an optimal amount of resources that need to be used to implement the solution, thus reducing network traffic and load on existing network resources (e.g., minimizing redundant attempts and queries and intelligently managing communication flows). In other words, the solution may bypass a series of steps previously implemented, thus further conserving network resources. Furthermore, the technical solution described herein uses a rigorous, computerized process to perform specific tasks and/or activities that were not previously performed.

FIGS. 1A-1C illustrate technical components of an exemplary distributed computing environment 100 for communication data identification and alert generation via a machine learning framework, in accordance with an implementation of the disclosure. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an implementation of the distributed computing environment 100, and it will be appreciated that in other implementations one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some implementations, the system 130 and the endpoint device(s) 140 may have a client-server relationship in which the endpoint device(s) 140 are remote devices that request and receive service from a centralized server, i.e., the system 130. In some other implementations, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. In addition to shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an implementation of the disclosure. As shown in FIG. 1B, the system 130 may include a processing device 102, memory 104, input/output (I/O) device 116, and a storage device 106. The system 130 may also include a high-speed interface 108 connecting to the memory 104, and a low-speed interface 112 connecting to a low-speed bus 114 and a storage device 106. Each of the components 102, 104, 108, 110, and 112 may be operatively coupled to one another using various buses and may be mounted on a common motherboard or in other manners as appropriate. As described herein, the processing device 102 may include a number of subsystems to execute the portions of processes described herein. Each subsystem may be a self-contained component of a larger system (e.g., system 130) and capable of being configured to execute specialized processes as part of the larger system.

The processing device 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processing devices, along with multiple memories, and/or I/O devices, to execute the processes described herein. In other words, as used herein, a "processing device" means one processing device (e.g., a microprocessor) that performs the defined functions or a plurality of processing devices (e.g., microprocessors) that collectively perform defined functions such that the execution of the individual defined functions may be divided amongst such processing devices.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly implemented in an information carrier. The computer program product may also contain instructions that, when executed, perform one or more methods, such as those described above. The information carrier may be a non-transitory computer- or machine-readable storage medium, such as the memory 104, the storage device 106, or memory on processing device 102.

The high-speed interface 108 manages bandwidth-intensive operations for the system 130, while the low-speed controller 112 manages lower bandwidth-intensive operations. Such allocation of functions is exemplary only. In some implementations, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an implementation of the disclosure. As shown in FIG. 1C, the endpoint device(s) 140 includes a processing device 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processing device 152 is configured to execute instructions within the endpoint device(s) 140, including instructions stored in the memory 154, which in one implementation includes the instructions of an application that may perform the functions disclosed herein, including certain logic, data processing, and data storing functions. The processing device may be implemented as a chipset of chips that include separate and multiple analog and digital processors. The processing device may be configured to provide, for example, for coordination of the other components of the endpoint device(s) 140, such as control of user interfaces, applications run by endpoint device(s) 140, and wireless communication by endpoint device(s) 140.

The processing device 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processing device 152. In addition, an external interface 168 may be provided in communication with processing device 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some implementations, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly implemented in an information carrier. The computer program product contains instructions that, when executed, perform one or more methods, such as those described herein. The information carrier is a computer- or machine-readable medium, such as the memory 154, expansion memory, memory on processing device 152, or a propagated signal that may be received, for example, over transceiver 160 or external interface 168.

In some implementations, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some implementations, one or more applications operating on the system 130.

The endpoint device(s) 140 may also communicate audibly using audio codec 162, which may receive spoken information from a user and convert the spoken information to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some implementations, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a graphical architectural representation of communication data identification and alert generation via a machine learning framework, in accordance with an implementation of the disclosure. FIG. 2 serves as an overview of an exemplary data flow architecture and flowchart that corresponds to the process flow will be described in detail herein with respect to FIGS. 4A and 4B, and thus shall not be construed as limiting in nature.

Interaction data is received as a stream from the endpoint devices in block 202. In some implementations, the interaction data may be received by an interactive voice response ("IVR") system 204 that allows users providing the interaction data to access pre-recorded voice data messages and navigate through various predetermined menus. Block 206 may include a communication engine 206a (which may be in communication with the IVR 204), a zero-trust network adapter 206b, a real-time conversation analytics machine learning model 206c, a conversation flow predicter 206d and an interaction handler 206e. The communication engine 206a may communicate with external interfaces 208 and internal repositor(ies) 210. The external interfaces 208 may include user-reported digital service disruption aggregates (i.e., a down detector) 208a, social media data feeds 208b, network outages 208c, and/or feeds from external outages 208d. The internal repository 210, (which may also be referred to herein as one or more "repository databases") may include monitoring tool feeds 210a, direct user inputs 210c, known failure feeds 210c, and/or structured query reporter inputs 210d.

The interactive handler 206e, may be in communication with a flow mapper 212 to determine the differences between actual flow (e.g., volume of interaction data) and predicted flow. After the flow mapper 212, the system may determine if there is a known failure path (i.e., a status of a first underlying service that indicates the underlying service being non-functional or otherwise not operating at full functionality). As used herein, an "underlying service" may refer to the foundational banking services and systems that support various financial operations, such as account management, transaction processing, loan servicing, malfeasance detection, and customer authentication.

If there is a known failure, the notification engine 218 may be implemented to generate a notification signal. Otherwise, the customer intent-based handler 216 may be implemented to direct the interaction to a disposition aligned with the user's needs.

FIG. 3 illustrates an exemplary machine learning model subsystem architecture 300, in accordance with an implementation of the disclosure. The machine learning subsystem 300 may include a data acquisition engine 302, data ingestion engine 310, data pre-processing engine 316, machine learning model tuning engine 322, and inference engine 336.

The data acquisition engine 302 may identify various internal and/or external data sources to generate, test, and/or integrate new features for training the machine learning model. These internal and/or external data sources 304, 306, and 308 may be initial locations where the data originates or where physical information is first digitized. The data acquisition engine 302 may identify the location of the data and describe connection characteristics for access and retrieval of data. In some implementations, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some implementations, the these data sources 304, 306, and 308 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of network resources to process. Feature extraction and/or selection may be used to select and/or combine variables into features, effectively reducing the amount of data that must be processed, while still accurately and completely describing the original data set.

Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points. As will be understood in view of the present disclosure, training data 318 may additionally, or alternatively, be provided from a third party, having been generated as synthetic data.

The machine learning model tuning engine 322 may be used to train a machine learning model to form a trained machine learning model 332 using the training data 318 to make predictions or decisions without explicitly being programmed to do so. The machine learning model 332 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms can adjust their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the machine learning model tuning engine 322 may repeatedly execute cycles of experimentation 326, testing 328, and tuning 330 to optimize the performance of the machine learning algorithm 320 and refine the results in preparation for deployment of those results for consumption or decision making. To this end, the machine learning model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots . C\_n$ 338) or observations based on defined classifications, represent possible solutions to a decision based on certain conditions, model complex relationships between inputs and outputs to find patterns in data or capture a statistical structure among variables with unknown relationships, and/or or the like. On the other hand, machine learning models trained using unsupervised learning algorithms may be used to group (e.g., $C\_1, C\_2 \ldots . C\_n$ 338) live data 334 based on how similar they are to one another to solve exploratory challenges where little is known about the data, provide a description or label (e.g., $C\_1, C\_2 \ldots . C\_n$ 338) to live data 334, such as in classification, and/or the like. These categorized outputs, groups (clusters), or labels are then presented to the user input system 130. In still other cases, machine learning models that perform regression techniques may use live data 334 to predict or forecast continuous outcomes.

It shall be understood that the implementation of the machine learning subsystem 300 illustrated in FIG. 3 is exemplary and that other implementations may vary. As another example, in some implementations, the machine learning subsystem 300 may include more, fewer, or different components.

FIGS. 4A-4B illustrate a process flow for communication data identification and alert generation via a machine learning framework, in accordance with an implementation of the disclosure. At block 402 the system 130 may determine a status of an underlying service (e.g., a "first status"). It shall be appreciated that underlying services, as defined previously herein, may have various statuses, including, but not limited to active (i.e., fully functioning and processing data at the expected rate), partially active (i.e., partially functioning and processing data at a rate less than what is expected), or inactive (i.e., non-functioning and not processing data). Indeed, one, two, or many such designations may be predetermined and set forth as indicators of the level of service provided by the underlying service, where some levels of service may result in user complaints or delays in processing of data, thus potentially leading to an interaction between the user and the entity to inquire about the status of a resource transfer or other event.

The first status may be determined based on communications with at least one external interface, at least one repository database, or both. The at least one external interface may include internet websites having various APIs to which the system 130 receives data feeds regarding the status of underlying services, otherwise known as user-reported digital service disruption aggregates. For example, a "down detection" website may receive user reports regarding a service, utility, or other underlying service that is inoperable or malfunctioning. The system 130 herein may receive such status via an API of the "down detection" website. Similarly, social media feeds may be received via an API or crawling of social media sites. Natural language processing may be implemented to determine the nature of posts on such social media pages and such posts thereafter utilized to infer a first status, alone or in combination with other data feeds. Additionally, or alternatively, feeds from external outages, for example utility, telecommunication, government, or others may provide outage feeds to indicate the status(es) of various underlying services. Additionally, or alternatively, news organization websites or alerts may be analyzed through natural language processing to infer a first status.

The at least one repository database may be used to determine the first status, where the at least one repository database is an internal repository within the entity, and/or within the network. For example, monitoring tools may have feeds, where the monitoring tool is a software platform that ingests, indexes, and analyzes machine-generated data, real-time data on system health, then monitors and identifies patterns and thereafter detects anomalies. Such anomalies may be inferred to be representative of a first status of a corresponding underlying service. Additionally, or alternatively, direct user inputs may also allow for the determination of first status. In other words, the first status may be input manually by a user associated with the entity (e.g., an employee), either directly into the system 130 or via a database including such indications made manually, where the database is located elsewhere on the network. Additionally, or alternatively, determination of the first status may be a result of receiving inputs from structured query reporter ("SQR") reports and data exports that integrate SQL queries to fetch data and process the data to provide reports regarding data.

Next, at block 404, the system 130 may receive a stream of interaction data from a first user via at least one channel. A first user, which may be a customer, client, or other inquirer, may initiate an interaction with the entity. This initiation of an interaction may be the start of a phone call, a text chat message to a chatbot or multi-channel cognitive interaction platform, a connection to a video chat, a voice prompt to a multi-channel cognitive interaction platform, or the like.

After the initiation of the interaction, interaction data may flow to the system 130 via the at least one channel. In some implementations, examples of channels include, but are not limited to a multi-channel cognitive resource platform, a web interface, an email interface, a mobile phone application, a telephone communication, or the like. Indeed, many such channels are contemplated, any of which is suitable for the present disclosure, provided that the channel results in interaction data being provided to the system 130.

The process may then continue at block 406, where the system 130 classifies an interaction via a first machine learning model 332. The first machine learning model 332 is a trained machine learning model. "Classifying" the interaction may include various steps, functions, and analyses discussed henceforth, all with the goal of determining who the first user is, predicting the reason the first user is interacting with the entity (i.e., providing interaction data), determining if the interaction is a recurring event that is typical of the first user (i.e., not an anomaly), and so forth, in preparation for generating a notification.

To describe in detail the classifying of the interaction via the first machine learning model 332, we now turn to FIG. 4B, where, at block 420, the system 130 may identify an identity of the first user based on the interaction. The system 130 may receive a phone number, IP address, geolocation, IMEI numeric identifier, MAC address, other hardware identifier, account number, application login information, date of birth, address, internet cookies, or the like and compare such information with one or more information databases containing records of users. In some implementations, these records may include historical call frequency data and historical call duration data, where such call data may have been recorded during previous interactions with the entity. The first machine learning model 332 may analyze the foregoing identifiable information received by the system 130 and generate an output of a predicted identity of the first user. The first machine learning model 332 could be trained using a dataset containing record data, where parameters are iteratively adjusted to minimize the error between its predictions and the actual outcomes. During training, optimization techniques may be utilized, as described with respect to FIG. 3. Once trained, the output may be characterized by an identity or a record corresponding to the identity.

In some implementations, the identity of the first user may include resource transfer data associated with an account of the first user. For example, the identity of the first user may be associated with a database containing transactions to and from an account of the first user, any or all of such transactions potentially being related to the motivation for the interaction between the first user and the entity.

At block 422, the system 130 may collect interaction data volume associated with the first user. For example, the frequency of an interaction between the user, as previously identified, and the entity, over a given timespan. For example, a first user may interact with the entity via a phone call five (5) times over the course of one (1) hour. Each interaction may be recorded in a database and tagged or otherwise associated with the first user, including metadata regarding the duration of the interaction, geolocation of the interaction, dates and times of the start or stop of the interaction, and so forth. Interaction data volume may be calculated as a function of number of interactions per minute, per hour, per day, per week, and so forth. This volume calculation may further be multiplied by a factor such as length of the interactions, longest length of any given interaction, average length of interaction, or the like.

Next, at block 424, the system 130 may compare the interaction data volume to a predetermined interaction data baseline volume. The interaction data volume determined at block 422 may only be useful if for the purposes of determining if any given interaction data volume is higher or lower than anticipated, such as to indicate that the first user is concerned with a particular matter or if the recent interaction data volume is habitual and of no additional concern to the entity.

At block 426, the system 130 may determine an interaction pattern associated with the identity of the first user. An interaction pattern may take one of several different forms. As one example, the interaction pattern may be a binary indicator, such as "normal" or "not normal", such as to indicate whether the interaction volume is higher than expected or not. In other implementations, the interaction pattern may be a numerical value on a predetermined scale, such as from 1 to 10, 1 to 100, and so forth. The first machine learning model 332 may analyze the foregoing interaction data volume and predetermined interaction data received by the system 130 and generate an output of an interaction pattern. The first machine learning model 332 could be trained using a dataset containing the aforementioned record data containing the predetermined interaction data baseline volume and other data, where parameters are iteratively adjusted to minimize the error between its predictions and the actual outcomes. During training, optimization techniques may be utilized, as described with respect to FIG. 3. Once trained, the output may be characterized by an interaction pattern corresponding to the identity.

At block 428, the system 130 may repeat the classifying of the interaction at a predetermined interval during the receiving of the stream of the interaction data. Stated differently, the system 130 may repeat one or more of the actions of block 406 (e.g., the determining of an identity, collecting of interaction data volume, comparison of the interaction data volume to a baseline, and/or determining the interaction pattern) in an ongoing manner according to predetermined time intervals, for example, every 5 seconds, 10 seconds, 30 seconds, 1 minute, 2 minutes, 3 minutes, 5 minutes, 10 minutes, 30 minutes, or any other length of time. In doing so, the system 130 may effectively re-affirm the identity of the first user on a continuous basis and thereby create a "zero-trust" framework.

Returning now to FIG. 4A, and continuing at block 408, the system 130 may generate a first notification signal via a second machine learning model 332. It shall be appreciated that one significant benefit of the instant system 130 is to calm the first user or otherwise convey messaging to the first user concerning the predicted reason why the first user is interacting with the entity. As such, a second machine learning model 332 may be implemented to generate, (e.g., through "generative AI") voice data, text data, audio data, graphics, sounds, or combinations thereof to convey such messaging. The second machine learning model 332 may receive the first status of the underlying service and the interaction pattern associated with the identity and generate an output of a first notification signal. The second machine learning model 332 could be trained using a dataset containing messages (e.g., text data, graphics, or the like) and/or images, audio data, or the like deemed to be dispositive of a predicted inquiry and labeled as such. For example, for an interaction occurring within a day of a first user depositing a check, where it is known that the underlying service of check processing is experiencing an outage, the second machine learning model 332 may generate audio containing a voice that alerts the first user (once the first user interacts with the entity, for example by phone) that the check will be processed within 24 hours and apologize for the underlying service being down. Parameters of the second machine learning engine may be iteratively adjusted to minimize the error between its predictions and the actual outcomes. During training, optimization techniques may be utilized, as described with respect to FIG. 3. Once trained, the output of the second machine learning model 332 may be characterized by the first notification signal.

In some implementations, the second machine learning model 332 and the first machine learning model 332 are the same machine learning model 332, while in other implementations, the first and second machine learning models may refer to multiple machine learning models in coordination with each other by the system 130.

At block 410, the system 130 may transmit the first notification signal via the at least one channel to a first endpoint device 140 associated with the first user. The first notification signal may be sent using a pre-determined communication protocol, and through a wireless network, a wired connection, or an internet-based platform, depending on the infrastructure in place. In some implementations, the first notification signal may trigger a notification alert to capture the first user's attention. To this end, at block 412, the first notification signal (or the notification alert triggered by the notification signal) may include data for display of a splash banner, and the system 130 may display the splash banner on a first endpoint device 140 associated with the first user.

The first notification signal, having been generated by the second machine learning model 332, contains the messaging to be provided to the first user. As non-limiting examples, the messaging in the first notification signal may be text on a banner, audio, video, or the like that reads "The underlying service is currently experiencing a temporary outage, and we expect the outage to last an additional 3 hours."

At block 414, in addition to, or as an alternative to the first notification signal, the code may further cause the apparatus to generate a second notification signal via the second machine learning model 332. The second notification signal may be a variation of the first notification signal but intended for a different user (e.g., a second user) than that of the first notification signal. For example, the second notification signal may be intended to be transmitted to a user associated with the entity (e.g., a customer service representative) to provide said user with instructions for communicating with the first user. Next, at block 416, transmit the second notification signal to a second endpoint device 140 associated with a second user.

For example, the second machine learning model 332 may generate a first notification signal that is transmitted to the first endpoint device 140 that provides the audio message "We are experiencing a temporary outage with the service; please stay on the line for a representative." In this example, the second machine learning model 332 has also generated a second notification signal that is transmitted to a second endpoint device 140, which is associated with the "representative" (i.e., second user). The second notification signal may include text that is displayed to the second user on the second endpoint device 140 that provides the second user with a script for speaking to the first user. The interaction may then be routed such that the first and second users are in direct communication, allowing the second user to read the text of the second notification signal such as "We indeed have a temporary outage with the service, and we are willing to offer you X, Y, or Z to accommodate you in the meantime."

The process may continue at block 418, where, in some implementations, after transmitting the first notification signal, the system 130 may receive a disposition signal from the first endpoint device 140 via the at least one channel. It shall be appreciated that the message provided by the first notification signal may not provide the first user with an adequate resolution to the inquiry and reason for the interaction. Accordingly, the system 130 may be configured to receive a disposition signal, for example an entry of a predetermined number or word into the user interface of the first endpoint device 140 (i.e., a disposition input) to re-route the interaction (i.e., the stream of the interaction data) for example, to the second endpoint device 140.

As will be appreciated by one of ordinary skill in the art, the present disclosure may be implemented as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other implementations of the present disclosure set forth herein will come to mind to one skilled in the art to which these implementations pertain having the benefit of the teachings presented in the foregoing descriptions and the associated drawings. Although the Figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system for communication data identification and alert generation via a machine learning framework, the system comprising:

a processing device;

a non-transitory storage device containing instructions when executed by the processing device, causes the processing device to perform the steps of:

determining a first status of an underlying service, wherein the first status is determined based on at least one selected from the group consisting of (i) communication with at least one external interface, (ii) communication with at least one repository database;

receiving a stream of interaction data from a first user via at least one channel;

classifying an interaction via a first machine learning model, wherein classifying the interaction comprises:

identifying an identity of the first user based on the interaction; and determining an interaction pattern associated with the identity of the first user;

generating a first notification signal via a second machine learning model, wherein the second machine learning model is provided, as inputs, the first status of the underlying service and the interaction pattern associated with the identity;

transmitting the first notification signal via the at least one channel to a first endpoint device associated with the first user; and receiving, after transmitting the first notification signal, a disposition signal from the first endpoint device via the at least one channel, wherein the disposition signal comprises a disposition input.

2. The system of claim 1, wherein the first notification signal comprises a splash banner.

3. The system of claim 2, wherein the instructions further cause the processing device to perform the steps of:

displaying the splash banner on a first endpoint device associated with the first user.

4. The system of claim 1, wherein the instructions further cause the processing device to perform the steps of:

generating a second notification signal via the second machine learning model; and transmitting the second notification signal to a second endpoint device associated with a second user.

5. The system of claim 1, wherein determining the interaction pattern associated with the identity of the first user comprises the instructions further causing the processing device to perform the steps of:

collecting interaction data volume associated with the first user; and comparing the interaction data volume to a predetermined interaction data baseline volume.

6. The system of claim 1, wherein the instructions further causing the processing device to perform the steps of:

repeating the classifying of the interaction at a predetermined interval during the receiving of the stream of the interaction data.

7. The system of claim 1, wherein the disposition input comprises a request to re-route the stream of the interaction data.

8. The system of claim 1, wherein the identity of the first user comprises historical call frequency data and historical call duration data.

9. The system of claim 1, wherein the identity of the first user comprises resource transfer data associated with an account of the first user.

10. The system of claim 1, wherein the at least one external interface is at least one selected from a group consisting of (i) social media data feeds, and (ii) user-reported digital service disruption aggregates.

11. The system of claim 1, wherein the at least one repository database is at least one selected from a group consisting of (i) monitoring tool feeds, (ii) direct user inputs, and (iii) structured query reporter inputs.

12. The system of claim 1, wherein the at least one channel is at least one selected from a group consisting of (i) a multi-channel cognitive resource platform, (ii) a web interface, (iii) an email interface, (iv) a mobile phone application, and (v) telephone communication.

13. A computer program product for communication data identification and alert generation via a machine learning framework, the computer program product comprising a non-transitory computer-readable medium comprising code causing an apparatus to:

determine a first status of an underlying service, wherein the first status is determined based on at least one selected from the group consisting of (i) communication with at least one external interface, (ii) communication with at least one repository database;

receive a stream of interaction data from a first user via at least one channel;

classify an interaction via a first machine learning model, wherein classifying the interaction comprises:

identifying an identity of the first user based on the interaction; and determining an interaction pattern associated with the identity of the first user;

generate a first notification signal via a second machine learning model, wherein the second machine learning model is provided, as inputs, the first status of the underlying service and the interaction pattern associated with the identity;

transmit the first notification signal via the at least one channel to a first endpoint device associated with the first user; and receive, after transmitting the first notification signal, a disposition signal from the first endpoint device via the at least one channel, wherein the disposition signal comprises a disposition input.

14. The computer program product of claim 13, wherein the first notification signal comprises a splash banner.

15. The computer program product of claim 14, wherein the code further causes the apparatus to:

display the splash banner on a first endpoint device associated with the first user.

16. The computer program product of claim 13, wherein the code further causes the apparatus to:

generate a second notification signal via the second machine learning model; and transmit the second notification signal to a second endpoint device associated with a second user.

17. A method for communication data identification and alert generation via a machine learning framework, the method comprising:

determining a first status of an underlying service, wherein the first status is determined based on at least one selected from the group consisting of (i) communication with at least one external interface, (ii) communication with at least one repository database;

receiving a stream of interaction data from a first user via at least one channel;

classifying an interaction via a first machine learning model, wherein classifying the interaction comprises:

identifying an identity of the first user based on the interaction; and determining an interaction pattern associated with the identity of the first user;

generating a first notification signal via a second machine learning model, wherein the second machine learning model is provided, as inputs, the first status of the underlying service and the interaction pattern associated with the identity;

transmitting the first notification signal via the at least one channel to a first endpoint device associated with the first user; and receiving, after transmitting the first notification signal, a disposition signal from the first endpoint device via the at least one channel, wherein the disposition signal comprises a disposition input.

18. The method of claim 17, wherein the first notification signal comprises a splash banner.

19. The method of claim 18, further comprising:

displaying the splash banner on a first endpoint device associated with the first user.

20. The method of claim 17, further comprising:

generating a second notification signal via the second machine learning model; and transmitting the second notification signal to a second endpoint device associated with a second user.

* * * * *